Oct. 29, 1940.  C. T. SMITH  2,220,028
APPARATUS FOR CONTROLLING TEMPERATURE OF FURNACES
Filed Aug. 26, 1936  2 Sheets-Sheet 1
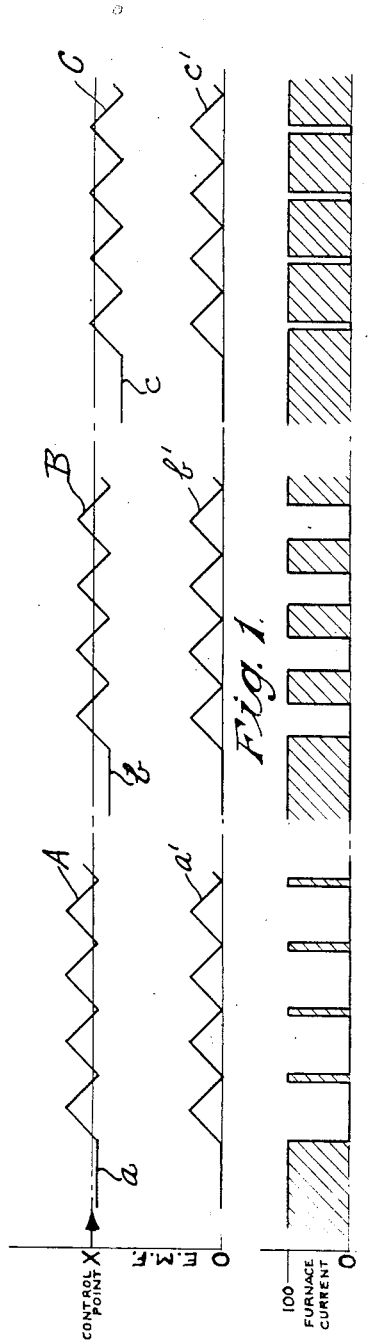
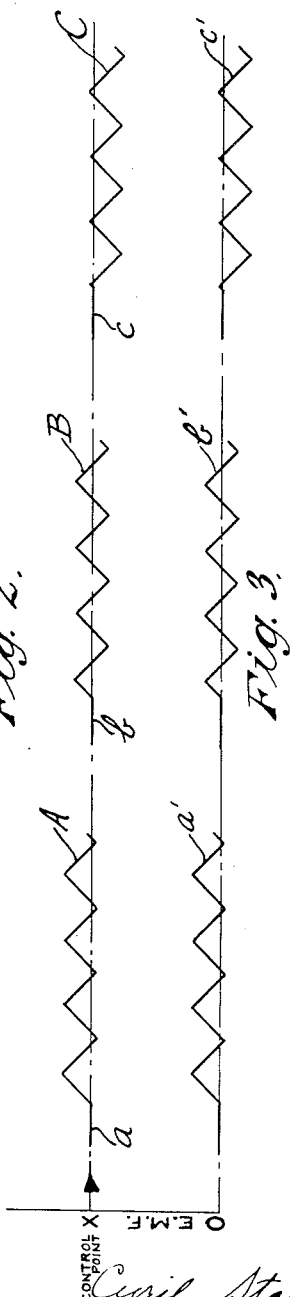
INVENTOR
Cyril Stanley Smith
BY
Wooster & Davis
ATTORNEYS Oct. 29, 1940.                    C. T. SMITH                    2,220,028
APPARATUS FOR CONTROLLING TEMPERATURE OF FURNACES
Filed Aug. 26, 1936                    2 Sheets-Sheet 2

INVENTOR
Cyril Stanley Smith
BY
Wooster & Davis
ATTORNEYS

Patented Oct. 29, 1940

2,220,028

UNITED STATES PATENT OFFICE 2,220,028

APPARATUS FOR CONTROLLING TEMPERATURE OF FURNACES

Cyril Stanley Smith, Cheshire, Conn.

Application August 26, 1936, Serial No. 98,102

7 Claims. (Cl. 236—15)

My invention relates to apparatus for controlling automatically the power input and temperature of electric furnaces, or other devices capable of similar electric control, and is characterised by the fact that the power input is continuously and automatically adjusted exactly to that required to hold the furnace and its contents at the desired temperature. Not only does my invention result in "straight line" control at a steady temperature, but a further advantage results from the fact that expensive auxiliary equipment such as rheostats or variable transformers are rendered totally unnecessary.

As is well known, temperature measurement and control at temperatures above about 300° C. is usually done by the use of a thermocouple composed of wires of two dissimilar metals or alloys, the electromotive force of the couple being approximately proportional to the difference between the temperatures of the hot and cold junctions, and measured by a millivoltmeter or a potentiometer. If the temperature of a furnace is to be controlled automatically the deflection of the millivoltmeter or galvanometer needle is, through a suitable mechanical, optical or electrical linking mechanism, made to operate a relay controlling part or all of the power input to the furnace. If the furnace becomes too hot, the power is switched off, and when the temperature once more drops a little below the desired value the millivoltmeter or galvanometer deflection operates the relay and turns the current on again. On account of the lag resulting from the necessary gap between the "on" and "off" contacts, and especially because of the heat capacity of the heating elements and their adjacent refractory in the furnace, there results considerable overshooting and undercooling, giving a temperature curve which is wavy and may oscillate a considerable amount above and below the desired value. This variation may be reduced by adjusting the power input to an amount which will not much more than hold the furnace at the desired temperature, so that heating is slower and overshooting is less. Even closer control is obtainable by arranging a circuit in which the relay controls only a portion of the whole power, but this requires auxiliary apparatus for the fine adjustment of the power, and is not proof against large variations of line voltage when closely adjusted.

The simplest way of applying the principle of my invention consists in applying a small periodically varying E. M. F. to the thermocouple circuit before it is applied to the controller, so that, at intervals of about one minute, the voltage at the controller terminals passes up and down through the control point, and so switches the power on and off once per cycle, even though the thermocouple E. M. F. has not changed. With this arrangement the duration of the "on" and "off" periods will be automatically adjusted so that the average power input over the complete cycle is exactly that required to hold the furnace at the set temperature. If the temperature should fall for any reason, the duration of the "on" period is automatically increased until the temperature once more increases. Thus, for example, if the maximum of the varying E. M. F. which is superimposed on that of the thermocouple corresponds to an increase in temperature of 10° C., the power will stay on continuously as the furnace is heating up from cold until the temperature reaches a point 10° below the control setting, when, at the part of the cycle when the applied E. M. F. is at its maximum, the power will be shut off momentarily. The duration of the "off" period will continue to increase as the temperature increases until, when the temperature reaches the control value the power will remain off all the time. In practice, before this would happen the temperature would have settled down because of the continuous reduction in power, and the furnace would be drawing just enough current, on the average for the complete cycle, to hold it at the desired temperature. It is obvious that from full power 10° below the control point to zero power at this value there is an infinite range of settings and the furnace will immediately reach equilibrium. Any of the ordinary types of temperature controller may be used for my method without change, and existing installations are readily modified to make use of my principle.

The cyclic actuating E. M. F. may be obtained in a number of ways. One of the simplest is from a potentiometer circuit consisting of a continuous loop of resistance wire through which a small steady current is passing, wrapped around a cylinder, and with a motor or clock driven contact rotating around it. Two current leads to this drop wire are necessary so that the tapped voltage rises smoothly and falls without interruption during one revolution of the contact. The circuit is completed by a suitable resistance (which is preferably adjustable) and a dry cell, battery or other fairly constant source of current.

By way of illustrating the principle of my invention Figure 1 of the accompanying drawings shows three examples of E. M. F. vs. time curves representing the simplest case.

Figure 2 shows the concurrent variation of furnace current plotted to the same time scale. The power is proportional to the shaded areas, and, although intermittently applied, heats the furnace to exactly the same temperature that a steady current of the same average value would.

Fig. 3 shows E. M. F. vs. time curves showing the effect of compensation obtained by displacement of the zero point of the actuating cycle so that it corresponds to the amount of power required.

Figure 4:
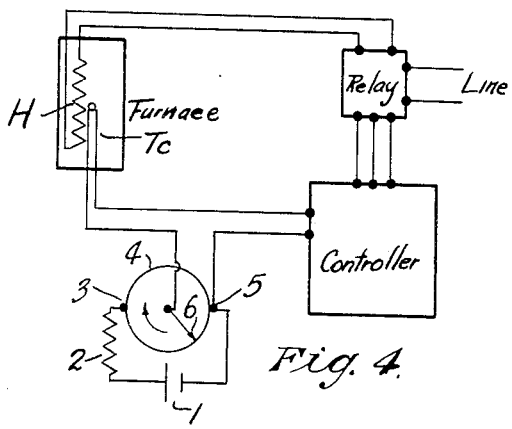
Figures 4, 5, 6 and 7 show diagrammatically examples of various circuits which may be used to carry out the invention.

In Fig. 1, the curves marked A, B, and C show the actual potential at the terminals of the controlling potentiometer or other controlling device. The component parts of these curves are $a$, $b$, and $c$, which represent the actual E. M. F. of the thermocouple, and $a'$, $b'$ and $c'$, which show the varying E. M. F. to actuate the controller according to my system, supplied from a separate source. This is shown at A, B, and C as being added to that of the thermocouple. The control setting represented by line and arrow X, is the same in each case, but in A, only 10 percent of the full power drawn by the furnace is required to hold the desired temperature, while in B 50 percent and in C 90 percent full power is required. The relay controlling the furnace current will be opened by the usual controller mechanism whenever the E. M. F. at the controller terminals exceeds the set value and will be closed whenever it falls below this point. Therefore the portion of the curves A, B and C above the base line X indicates the time when the power is cut off and the portion below the base line indicates the time when the power is turned on. In A the control point is near the bottom of the resultant E. M. F. curve, and the control setting and actual thermocouple E. M. F. (indicated by $a$) almost coincide; while at C, on the other hand, the resultant E. M. F. curve is principally below the control point, and unless compensation is applied, the furnace temperature needs to be at $c$, and therefore does not agree exactly with the setting of the controller. It will be seen that the true temperature of the furnace differs from the temperature indicated by the control setting by a fraction of the maximum displacement equal to that fraction of maximum power actually drawn by the furnace.

In order to avoid unnecessary wear on the relays the time for a complete cycle of the applied varying E. M. F. should not be too short, but neither should it be so long that in the "on" and "off" periods the temperature of the furnace can change a significant amount. The best frequency will depend on the heat capacity of the furnace, but for most cases may be of the order of one minute. It is desirable that the cycle be not shorter than at least ten times the period of operation of the controller being used. The curve of applied E. M. F. vs. time should be symmetrical and preferably linear, but a sine or saw tooth curve will also serve. The maximum applied E. M. F. must be sufficiently large to produce an appreciable galvanometer deflection, but the exact value is not important. If a highly sensitive galvanometer is used the E. M. F. may be very small, but it should not be smaller than the amount the furnace can change during the cycle for the danger of hunting and overshooting is thereby introduced. For many purposes a deflection corresponding to about 20° is suitable, but deflections as little as 1° or as great as 100° or even larger will work satisfactorily.

It will usually be desirable to correct or compensate for the error introduced by the deflection of the galvanometer necessary to adjust the power to that required. If a total deflection of only 10° is used, the varying actuating E. M. F. may be arranged half above and half below the control line, i. e., changing sign in relation to the thermocouple every half cycle, and in this case the temperature will be exactly that indicated by the controller setting when the furnace is drawing 50% power, and will never be more than 5° from this. Complete compensation can be provided by applying an E. M. F. equal to the displacement in the opposite direction, and the furnace will then be controlled exactly at the indicated point. If it be known approximately what percentage of maximum power the furnace requires for a given temperature of operation, close compensation can be obtained by setting the indicator the requisite number of degrees above the desired point, but it seems more desirable to arrange for manual displacement of the zero point of the actuating cycle so that it corresponds to the amount of power required. The effect of such compensation is shown in Figure 3, where the various symbols have the same meaning as in Fig. 1. As in Fig. 1 the curves A, B and C in Fig. 3 show the actual potential at the terminals of the controlling potentiometer or other controlling device. A, B, and C result from the addition of $a$, $b$, and $c$, the constant E. M. F. of the thermocouple (the same in each case) and the varying E. M. F.'s $a'$, $b'$ or $c'$ (supplied from an external source to actuate the controller according to my system) which differ in the displacement of their zero points to correspond to the amount of power required.

Figure 4 shows schematically an electrical circuit for controlling furnace temperature in this manner. The thermocouple Tc, controller, relay, and furnace are of customary design, arranged and connected in the usual way, and need no explanation. The heating unit is shown at H. The varying E. M. F. which causes the controller to actuate the relay at regular intervals is supplied by the simple potentiometer circuit 1, 2, 3, 4, 5. The battery 1 sends a small current through the regulating resistance 2 and the circular slide wire 3, 4, 5, and the circuit is completed to the battery. One of the leads from the thermocouple is connected to 3 or 5 and the other to the moving contact 6, which is driven around the slide wire 4 by a motor or clock (not shown) at an approximately constant speed, thus causing the E. M. F. to increase to a maximum and decrease to zero once per revolution of the contact.

Figure 5:
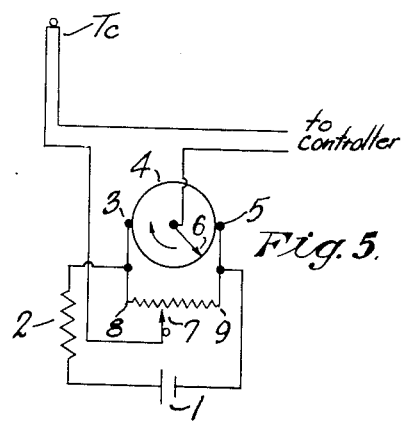

Compensation for the displacement of the critical point corresponding to the amount of power being used can be made manually by a circuit such as shown in Fig. 5. This is similar to Fig. 4, but the thermocouple lead there connected to the point 5 is now connected to the sliding contact 7 that runs along a second slidewire 8, 9, in parallel with the first, so that the null point of the cycle can be set at a point corresponding to any point in the actuating cycle, which will go above and below the adjustable zero in varying amounts, although the total algebraic change of E. M. F. is always the same (see Fig. 3).

Figure 6:
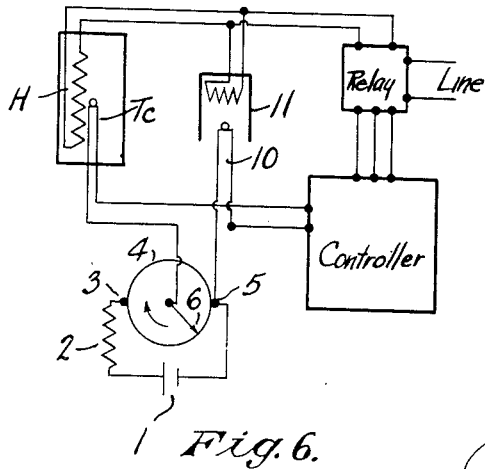

Fig. 6 shows a method of automatically compensating for the displacement. The actuating E. M. F. produced as in Fig. 4, by the potentiometer circuit 1, 2, 3, 4, 5, is opposed to the main thermocouple Tc, so that no compensation is necessary when the furnace is drawing no power, and an additional thermocouple 10 assists the principle thermocouple Tc but is made of such elements or shunted in such a way that when the small heater 11, in which it is placed, is permanently connected across the line the E. M. F. is just equivalent to the maximum of the cyclic actuating E. M. F. Reduction in the duration of power will change the temperature of the heater 11, and thus proportionately reduce the compensating E. M. F. given by the couple 10. The couple 10 may be placed in the furnace chamber itself, but it will then need to be adjusted for the furnace characteristics, which is unnecessary when a separate heater is used.

By the use of this cyclic E. M. F., which is the essence of my invention, the power input to a furnace can be precisely controlled with any of the types of thermoelectric or resistance temperature controllers now available. With an actuating cycle of about 90 seconds I have obtained excellent results with a potentiometer type of controller which operated every two seconds, and also with a millivoltmeter instrument with a twelve second cycle. In general it is better to use a controller with a short period of operation, so that the galvanometer deflection is checked a larger number of times during the main actuating cycle. A particularly suitable method makes use of a potentiometer circuit with a mirror galvanometer which reflects a beam of light through a suitable window on to a photoelectric cell, which in turn actuates a relay and turns the furnace current on or off immediately the temperature falls or rises, without further mechanical intervention.

Figure 7:
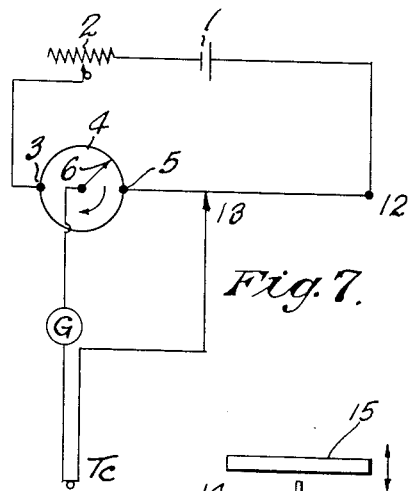

Although for the purpose of clarity I have described the actuating E. M. F. as coming from a separate circuit in series with the thermocouple, it is obvious that it is easily and most desirably incorporated with the circuit of the controlling potentiometer without the use of external batteries. Such a circuit is shown diagrammatically in Fig. 7. In this figure G is the galvanometer, 1 the battery of the potentiometer circuit and 2 an adjustable resistance. The usual standardizing circuit with a standard cell is omitted for clarity. The wire 5—12 is the main drop wire of the potentiometer, and an E. M. F. corresponding to any thermocouple temperature can be obtained by moving the contact 13. The means for varying the E. M. F. is shown at 3, 4, 5 and 6, the member 6 being the sliding contact running over the circular slide wire 4 as in the other figures. Whatever the source of E. M. F. it is advantageous to employ the motor driving the controller for also driving the sliding contact providing the actuating E. M. F.

Figure 8:
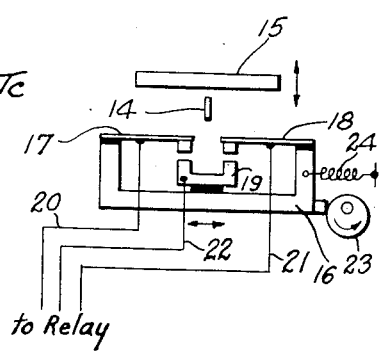
Fig. 8 is a diagrammatical view showing a modified arrangement for effecting the control.

Instead of applying the actuating cycle electrically, the same result may be obtained by causing a cyclic variation of the zero of the galvanometer by electrical, magnetic, or mechanical means; or by moving the control mechanism slowly back and forth across the galvanometer needle instead of deflecting the needle across the control mechanism. An arrangement for accomplishing this is indicated in Fig. 8. In this view the galvanometer needle is indicated at 14 and is connected so that it is responsive to the thermocouple circuit and its position is thus determined by the temperature being controlled. Above the needle is the depresser bar 15 which is periodically depressed against the needle in the usual manner by a cam or other suitable operating means (not shown). The period of this mechanism is usually from two to ten seconds. Below the needle is a slidable support carrying spring contacts 17 and 18 insulated from the support. Below these contacts is a third contact 19, and these contacts are connected to the control relay by the leads 20, 21 and 22. The support 16 is continuously reciprocated back and forth by a cam or other suitable means 23 driven at a uniform speed by any suitable motor (not shown), and the tension spring 24 to carry the contacts 17 and 18 alternately under the needle 14 during each cycle or period. This period is preferably about one minute, that is the cam 23 preferably makes about one revolution per minute, although of course this may be varied. It will be seen that in operation as the carrier is constantly reciprocated back and forth, when it is in position to bring contact 14 under the needle and the needle is depressed by bar 15 the contact engages contact 19 and closes circuit to operate the relay to turn on the heating medium, while when carrier 16 is shifted to carry contact 18 under the needle when the needle is depressed this contact will be shifted into engagement with contact 19 to operate the relay to cut off the heating medium. The length of time or length of periods the heating medium will thus be turned on or off will depend on the position of the needle 14 under the effect of the thermocouple. My invention includes these and other methods which, by means of an imposed cyclic displacement of the relative positions of the galvanometer and the actuating point of the control mechanism, produce a regular cycle of switching the current on and off for fractions of the cycle depending on the departure of the temperature from the set control point.

Although in the examples given above an electric furnace has been considered, it is apparent that similar means of control may be adapted to oil or gas fired furnaces by arranging for electrical control of the fuel supply. Indeed the principle can obviously be applied to other types of control apparatus, as, for example, the control of pressure, liquid level, etc., whenever these can be worked by intermittent power operation and controlled by variations of an E. M. F. or resistance. It will also be apparent that the cyclic variation of a control point by mechanical means can be applied to thermometric or pressure control using bimetallic strip or Bourdon tubes, or other method for converting the factor to be controlled into mechanical movement. The device is adapted for use in thermostatic control of heating and air conditioning apparatus for quarters for human habitation. By the definite on and off cycle at periods which are not too long, the uncomfortable hot and cold periods resulting from the large lag of such systems would be completely evened out. In applying my principle to such an installation, the control contacts or the zero setting of the bimetallic strip would be moved slowly back and forth over a range about the desired set point, and this would turn the furnace on and off once per cycle, with the duration of the on period depending on how far from the desired point the temperature actually was. It is obvious that the duration of the cycle must be adapted to the process being controlled and will in some cases be much longer than others.

Having thus set forth the nature of my invention, what I claim is:

1. In combination, an electric furnace, conductors for supplying heating current to the furnace, a circuit including a thermocouple responsive to the temperature in the furnace, a relay mechanism for controlling said current connected with said circuit so as to be responsive to variations in the E. M. F. of said thermocouple, and external means independent of the temperature in the furnace for superimposing on the thermocouple circuit a periodically varying E. M. F. in addition to that of the thermocouple sufficient to cause operation of the relay mechanism during each cycle of said varying E. M. F.

2. In combination, an electric furnace, means for supplying heating current to said furnace, a circuit including a thermocouple responsive to the temperature of the furnace, a relay mechanism for controlling said current connected with said circuit so as to be responsive to variations in the E. M. F. of said thermocouple, and external means independent of the temperature of the furnace for superimposing on the thermocouple circuit a periodically varying E. M. F. in addition to that of the thermocouple sufficient to cause operation of the relay mechanism to cut off and turn on the current to the furnace during each cycle of said varying E. M. F.

3. In combination, an electric furnace, means for supplying heating current to said furnace, a circuit including a thermocouple responsive to the temperature of the furnace, a relay mechanism for controlling said current connected with said circuit so as to be responsive to variations in the E. M. F. of said thermocouple, a circuit including a resistance and means supplying current to said circuit, a sliding contact on said resistance, means electrically connecting said contact and one side of the resistance in the thermocouple circuit, and means independent of the thermocouple for driving the contact to supply a periodically varying E. M. F. to the thermocouple circuit.

4. In combination, a furnace, a circuit including a thermocouple responsive to the temperature in the furnace, a mechanism for controlling the heat input to said furnace responsive to variations in the E. M. F. of said thermocouple, and external means independent of the thermocouple for superimposing on the thermocouple circuit a periodically varying E. M. F. in addition to that of the thermocouple sufficient to cause operation of the control mechanism during each cycle of said varying E. M. F.

5. In combination, a furnace, means for supplying a heating medium to the furnace, a circuit including a thermocouple responsive to the temperature in the furnace and a galvanometer responsive to the E. M. F. of the thermocouple, a mechanism dependent on the position of the galvanometer needle for automatically controlling the supply of heating medium to the furnace, and means for continuously and periodically varying the relation of the control mechanism to the galvanometer needle.

6. In combination, a furnace, means for supplying a heating medium to the furnace, a circuit including a thermocouple responsive to the temperature in the furnace and a galvanometer responsive to the E. M. F. of the thermocouple, a mechanism dependent on the position of the galvanometer needle for automatically controlling the supply of heating medium to the furnace, and means for periodically varying the relation of the control mechanism to the galvanometer needle by causing a continuous reciprocating motion of the control mechanism.

7. In combination, a furnace, means for supplying a heating medium to the furnace, a circuit including a thermocouple responsive to the temperature in the furnace and a galvanometer responsive to the E. M. F. of the thermocouple, a mechanism dependent on the position of the galvanometer needle for automatically controlling the supply of heating medium to the furnace, and means for periodically varying the relation of the control mechanism to the galvanometer needle by causing a continuous reciprocating motion of the galvanometer.

CYRIL STANLEY SMITH.